United States Patent [19]

Matsuki

[11] Patent Number: 4,548,038
[45] Date of Patent: Oct. 22, 1985

[54] SYSTEM FOR CONTROLLING THE SUPERCHARGING PRESSURE OF A TURBOCHARGED INTERNAL COMBUSTION ENGINE

[75] Inventor: Mitsuo Matsuki, Mitaka, Japan

[73] Assignee: Fuji Jukogyo Kabushiki Kaisha, Tokyo, Japan

[21] Appl. No.: 561,718

[22] Filed: Dec. 15, 1983

[30] Foreign Application Priority Data

Dec. 16, 1982 [JP] Japan ................................ 57-221348

[51] Int. Cl.$^4$ ........................................... F02B 37/12
[52] U.S. Cl. .................................................... 60/602
[58] Field of Search ................ 60/600, 601, 602, 603, 60/611; 123/564

[56] References Cited

U.S. PATENT DOCUMENTS

| | | | |
|---|---|---|---|
| 2,248,780 | 7/1941 | Pierce | 123/564 X |
| 2,417,363 | 3/1947 | Holley | 60/602 X |
| 2,480,621 | 8/1949 | Warner | 60/602 |
| 2,612,225 | 9/1952 | Sparrow | 60/602 X |

*Primary Examiner*—Michael Koczo
*Attorney, Agent, or Firm*—Martin A. Farber

[57] ABSTRACT

A system for correcting the supercharging pressure of an internal combustion engine having a supercharging device. A bypass is provided for bypassing a turbine of the supercharging device, a valve is provided in the bypass and an actuator for the valve is provided. The actuator comprises a housing partitioned by a first diaphragm into a supercharging pressure chamber and a first atmospheric pressure chamber, the supercharging pressure chamber communicating with the intake passage at the downstream side of the supercharging device; a first connecting rod operatively connects the first diaphragm to the valve so as to operate the valve. A compensating device is provided for offsetting the operating force by the atmospheric pressure. The compensating device comprises a housing, a second diaphragm provided in the housing, a vacuum chamber and a second atmospheric pressure chamber defined by the diaphragm, a spring for biasing the second diaphragm toward the second atmospheric chamber, and a second connecting rod for connecting the second diaphragm to the first rod so as to offset the force by the atmospheric pressure.

4 Claims, 2 Drawing Figures

SYSTEM FOR CONTROLLING THE SUPERCHARGING PRESSURE OF A TURBOCHARGED INTERNAL COMBUSTION ENGINE

BACKGROUND OF THE INVENTION

The present invention relates to a system for controlling the supercharging pressure of an internal combustion engine having a turbocharger.

An internal combustion engine for an automobile is provided with a turbocharger driven by a small capacity exhaust gas turbine, so that the turbocharger may operate at a low engine speed. In such an engine, the supercharging pressure increases excessively with an increase of engine speed, with the risk of breakdown of the engine at high engine speed. In order to avoid this, various systems have been proposed. A conventional system comprises a bypass provided around the exhaust-gas turbine, a waste gate valve in the bypass, and an actuator for operating the waste gate valve. The actuator comprises a diaphragm operatively connected to the waste gate valve, the diaphragm partitioning the actuator into chambers at atmospheric pressure and at the supercharging pressure respectively. The diaphragm is deflected by the difference between the atmospheric pressure and the supercharging pressure as the supercharging pressure increases. Thus, the actuator operates to open the waste gate valve to discharge the exhaust gases through the bypass when the engine speed is higher than a predetermined speed. Accordingly, the increase of the supercharging pressure is limited.

However, since the atmospheric pressure is low at high altitude and therefore the actuator operates at a low supercharging pressure, the supercharging pressure is held at a lower maximum value than at low altitude, for the same engine speed. Therefore, an increase of the engine output by the turbocharger cannot be obtained at high altitude.

SUMMARY OF THE INVENTION

An object of the present invention is to provide a system which controls the supercharging pressure to a proper value regardless of the atmospheric pressure, whereby the engine output is increased also at high altitude by supercharging.

According to the present invention, there is provided a system for correcting the supercharging pressure of an internal combustion engine having a supercharging device, an intake passage, and an exhaust passage, comprising: a bypass for bypassing a part of the supercharging device; a valve provided in the bypass; an actuator comprising a housing partitioned by a first diaphragm into a supercharging pressure chamber and a first atmospheric pressure chamber, the supercharging pressure chamber communicating with the intake passage at a downstream side of the supercharging device; first connecting means for operatively connecting said first diaphragm to said valve so as to operate the valve; and means for offsetting the operating force by the atmospheric pressure in said atmospheric pressure chamber, said means comprises a housing, a second diaphragm provided in said housing, a vacuum chamber and a second atmospheric pressure chamber defined by said diaphragm, a spring for biasing said second diaphragm toward said second atmospheric chamber, and second connecting means for connecting said second diaphragm to said first diaphragm so as to offset the force by the atmospheric pressure.

The present invention will be more apparent from the following description made with reference to the accompanying drawings.

DETAILED DESCRIPTION OF THE PREFERRED EMBODIMENT

Figure 1:
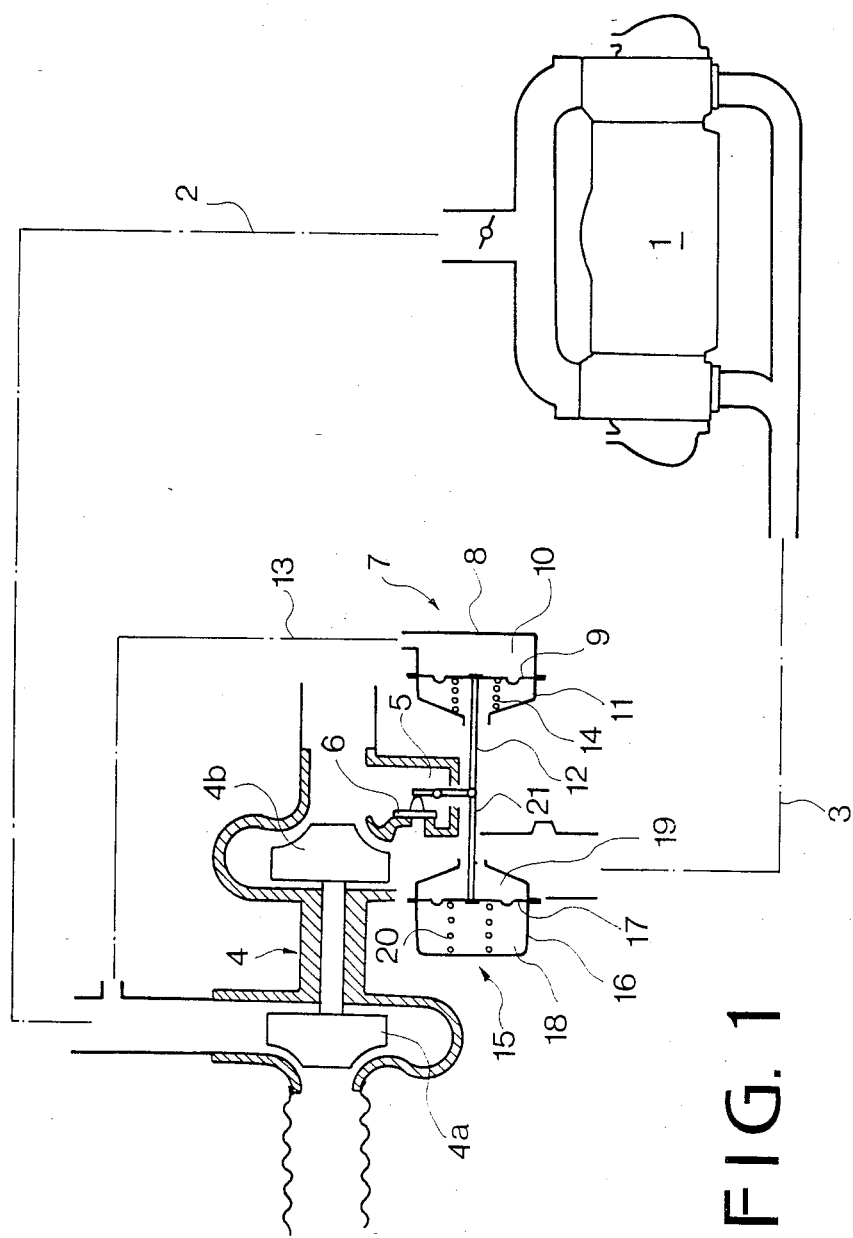
FIG. 1 is a schematic view of a system according to the present invention.

Referring to FIG. 1, an engine 1 is provide with an intake manifold 2 and an exhaust manifold 3. A turbocharger 4 is installed in the engine 1. The turbocharger 4 comprises a compressor 4a in the intake manifold 2 and an exhaust-gas turbine 4b provided in the exhaust manifold 3 of the engine so as to be driven by exhaust gases from the engine. The compressor 4a is operatively connected to the turbine 4b to supercharge intake air to the engine. A bypass 5 is connected to the exhaust manifold 3 to bypass the turbine 4b. Provided in the bypass 5 is a waste gate valve 6 which is adapted to be operated by an actuator 7. The actuator 7 comprises a housing 8, a diaphragm 9 connected to the housing and defining a supercharging pressure chamber 10 and an atmospheric pressure chamber 11, and a spring 14 for biasing the diaphragm 9 toward the supercharging pressure chamber 10. The diaphragm 9 is operatively connected to a lever of the waste gate valve 6 by a rod 12 to operate the waste gate valve 6. The supercharging pressure chamber 10 is communicated with the intake manifold 2 by a conduit pipe 13. The conduit pipe 13 opens into the intake manifold 2 at the downstream side of the compressor 4a so as to supply the supercharging air to the chamber 10.

In accordance with the present invention, an atmospheric pressure compensating device 15 is provided. The device comprises a housing 16, a diaphragm 17 connected to the housing and having the same area as the diaphragm 9, a vacuum chamber 18 and an atmospheric pressure chamber 19 defined by the diaphragm 17, and a spring 20 to bias the diaphragm 17 toward the atmospheric pressure chamber 19. The atmospheric pressure chamber 19 is opposed to the atmospheric pressure chamber 11. The diaphragm 17 is connected to the rod 12 by a rod 21.

In operation, when the supercharging pressure applied from the intake manifold 2 to the chamber 10 is low, the diaphragm 9 is deflected by the spring 14 to close the waste gate valve 6. Thus, all the exhaust gas discharged from the engine is supplied to the turbine 4b to drive it, thereby to drive the compressor 4a. Accordingly, a large amount of air is supplied to the engine at a high supercharging pressure. When the supercharging pressure reaches a predetermined high value, the diaphragm 9 is deflected by that pressure against the springs 14 and 20 to open the waste gate valve 6. Thus, some of the exhaust gases pass through the bypass 5, and the output of the turbine 4b consequently decreases, thereby decreasing the supercharging pressure.

When the environmental air pressure decreases at a high altitude, the supercharging pressure is controlled by the compensating device 15 as described hereinafter.

Force F exerted on the rod system comprising the rods 12 and 21 is expressed as follows.

$$F = A (Pc - (Po + Ps_1) + Po - Ps_2)$$
$$= A (Pc - (Ps_1 + Ps_2))$$

where
- A is the pressure receiving area of each of the diaphragms 9 and 17,
- Po is the atmospheric pressure,
- Pc is the supercharging pressure,
- $Ps_1$ is the reaction force of the spring 14, and
- $Ps_2$ is the reaction force of the spring 20. When the waste gate valve 6 is on its valve seat to close the bypass 5, the force F is zero, so that $Pc = Ps_1 + Ps_2$.

Accordingly, the atmospheric pressure does not influence the supercharging pressure Pc. That is, the force by the atmospheric pressure in the chamber 11 of the actuator 7 is offset by the atmospheric pressure in the chamber 19 of the compensating device 15, so that the supercharging pressure is determined only by the forces of the springs 14 and 20.

Figure 2:
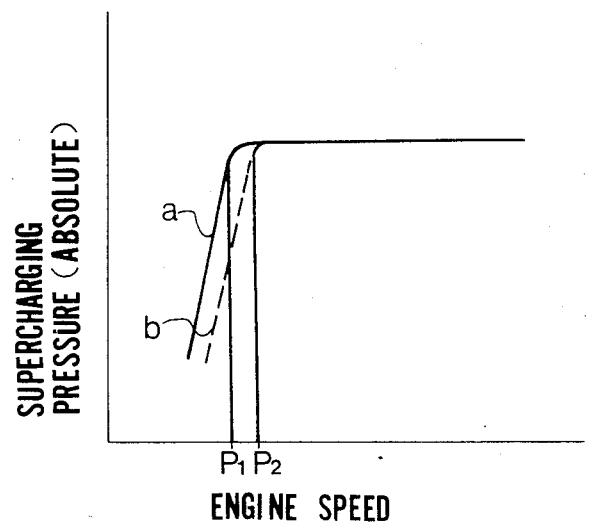
FIG. 2 is a graph showing a relationship between engine speed and supercharging pressure in the system of the present invention.

Thus, at high altitude, the supercharging pressure is controlled to the same value as at low altitude. In FIG. 2, line a shows a supercharging pressure at low altitude and line b is a supercharging pressure at high altitude. Respective pressures are constant at engine speeds higher than engine speeds $P_1$ and $P_2$ where the waste gate valve 6 is closed.

From the foregoing it will be understood that the present invention provides a system for a supercharged engine whereby supercharging may be effected at high altitude for preventing the decrease of the engine output.

While the presently preferred embodiment of the present invention has been shown and described, it is to be understood that this disclosure is for the purpose of illustration and that various charges and modifications may be made without departing from the spirit and scope of the invention as set forth in the appended claims.

What is claimed is:

1. A system for correcting the supercharging pressure of an internal combustion engine having a supercharging device, an intake passage, and an exhaust passage, comprising:
    said supercharging device comprising a turbine to be driven by exhaust gases and a compressor driven by the turbine,
    a bypass for bypassing said turbine;
    a valve provided in the bypass;
    an actuator comprising a housing partitioned by a first diaphragm into a supercharging pressure chamber and a first atmospheric pressure chamber, the supercharging pressure chamber communicating with the intake passage at the downstream side of the compressor;
    first connecting means for operatively connecting said first diaphragm to said valve so as to operate the valve; and
    means for offsetting the operating force by the atmospheric pressure in said atmospheric pressure chamber,
    said means comprises a housing, a second diaphragm provided in said housing, a vacuum chamber and a second atmospheric pressure chamber defined by said diaphragm, a spring for biasing said second diaphragm toward said second atmospheric chamber, and second connecting means for connecting said second diaphragm to said first diaphragm so as to offset the force by the atmospheric pressure.

2. The system according to claim 1 wherein said first and second atmospheric pressure chambers are opposed to each other.

3. The system according to claim 1 wherein said first and second connecting means are rods.

4. The system according to claim 1 wherein said first and second diaphragms are equal to each other in pressure receiving area.

* * * * *